(12) United States Patent
Albrecht et al.

(10) Patent No.: US 6,485,174 B1
(45) Date of Patent: Nov. 26, 2002

(54) ATTACHABLE HEAT FLUX MEASURING DEVICE

(75) Inventors: Melvin John Albrecht, Homeworth, OH (US); Scott Edward Hawk, Wadsworth, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 0 days.

(21) Appl. No.: 09/697,866

(22) Filed: Oct. 27, 2000

(51) Int. Cl.$^7$ .......................... G01K 17/08; G01K 1/14
(52) U.S. Cl. .......................... 374/29; 374/147; 374/179
(58) Field of Search .......................... 374/29, 30, 147, 374/179, 43; 122/504.2; 110/185

(56) References Cited

U.S. PATENT DOCUMENTS

| | | | | |
|---|---|---|---|---|
| 3,233,458 A | * | 2/1966 | Vrolyk | 374/30 |
| 3,267,726 A | * | 8/1966 | Sellers | 374/30 |
| 3,724,267 A | * | 4/1973 | Zoschak | 374/30 |
| 3,939,554 A | * | 2/1976 | Finney | 136/224 |
| 4,488,516 A | * | 12/1984 | Bueters et al. | 122/379 |
| 4,514,096 A | * | 4/1985 | Wynnyckyj et al. | 374/29 |
| 4,527,908 A | * | 7/1985 | Arisi | 374/29 |
| 4,607,961 A | * | 8/1986 | Wynnyckyj et al. | 374/30 |
| 4,722,610 A | * | 2/1988 | Levert et al. | 374/29 |

FOREIGN PATENT DOCUMENTS

| | | | | |
|---|---|---|---|---|
| DE | 0135984 | * | 12/1979 | 374/29 |

OTHER PUBLICATIONS

S. B. H. C. Neal et al, "The Measurement of Radiant Heat Flux in Large Boiler Furnaces–II Devel. of Flux Measuring Inst.", Int'l J. Heat and Mass Transfer, vol. 23, pp. 1023–1031, Great Britain, 1980.*

M.C. Ziemke, Heat Flux Transducers, Instruments and Control Systems, vol. 40, pp. 85–88, Dec. 1967.*

S. B. H. C. Neal et al, "Some new devices for the measurement of heat flux in power station boiler furnaces", J. Inst. of Energy, vol. 55, No. 422, Mar. 1982, pp. 8–14.*

M. I. Rudenko, "Pickup for local heat fluxes," High Temp. (USA), vol. 9, No. 4, p. 776, Aug. 1971.*

Bowen et al., "Heat Transfer in Membrane Waterwalls," *International Journal of Heat and Mass Transfer*, vol. 34, No. 4/5, 1991, pp. 1043–1057.

Di Pasquantonio et al., "Temperatures and Stressess in a Boiler Membrane Wall Tube," *Nuclear Engineering and Design*, vol. 31, No. 2, Jan., 1975, pp. 280–293.

Brochure entitled, "Chordal Thermocouples" published Nov. 1982 by The Babcock & Wilcox Company, USA (6 pages).

Brochure entitled, "Instruction for Use of Chordal Thermocouples" published before 1984 by The Babcock & Wilcox Company, USA (12 pages).

Brochure entitled, "Unique Heat Flux Sensors" published Mar. 1997 by Land Combustion, USA, (5 pages).

* cited by examiner

Primary Examiner—Diego Gutierrez
Assistant Examiner—Stanley J. Pruchnic, Jr.
(74) Attorney, Agent, or Firm—Eric Marich; Kathryn W. Grant

(57) ABSTRACT

A meter equipped with thermocouples which measure the combustion gas temperature used to calculate the heat flux at selected locations of a boiler furnace wall comprised of a series of tubes conveying pressurized water and separated by membranes. The meter extends through an opening in the membrane and is mounted on the outside of the furnace wall.

19 Claims, 2 Drawing Sheets

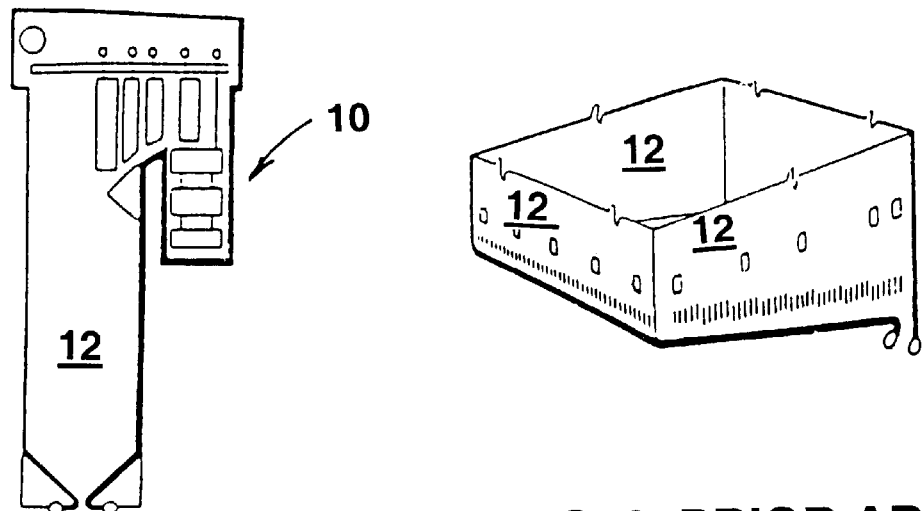
FIG. 1 PRIOR ART
FIG. 2 PRIOR ART
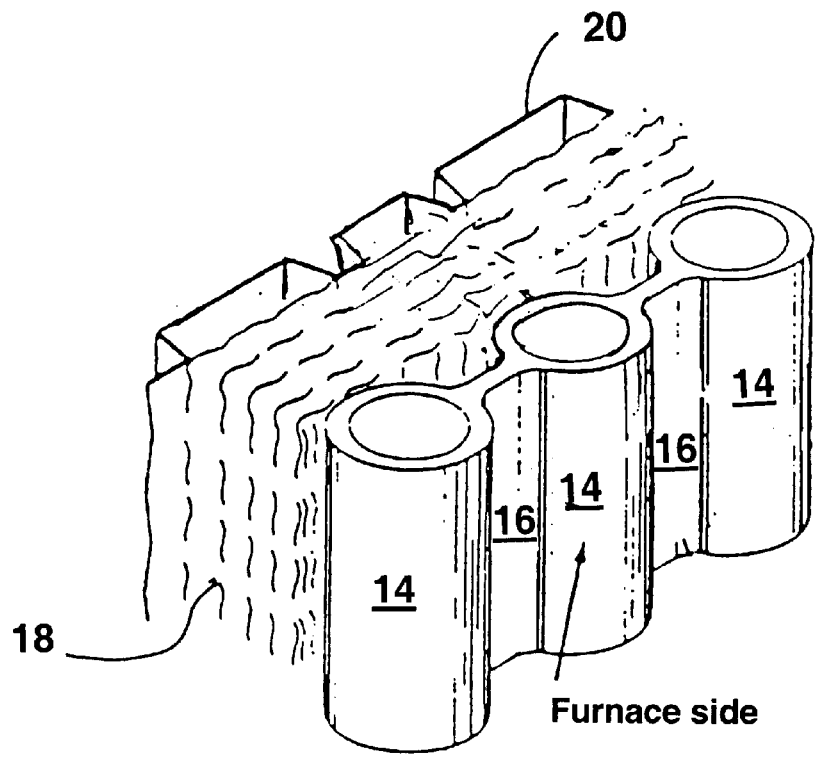
FIG. 3 PRIOR ART

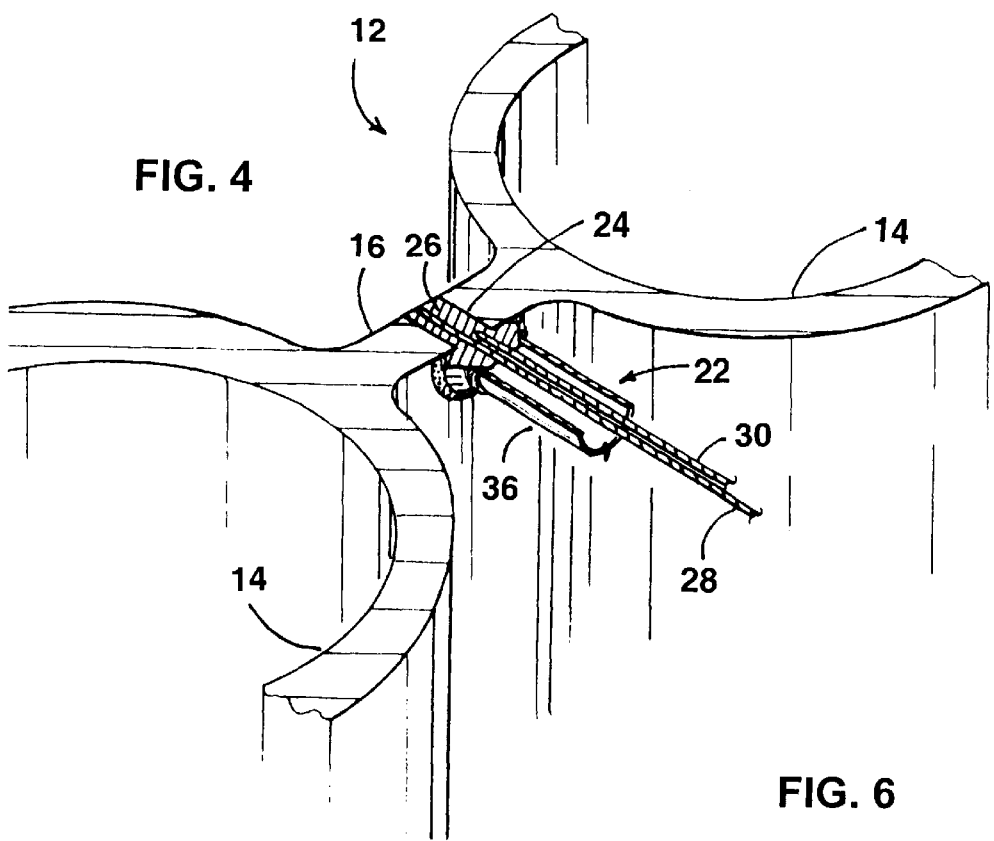
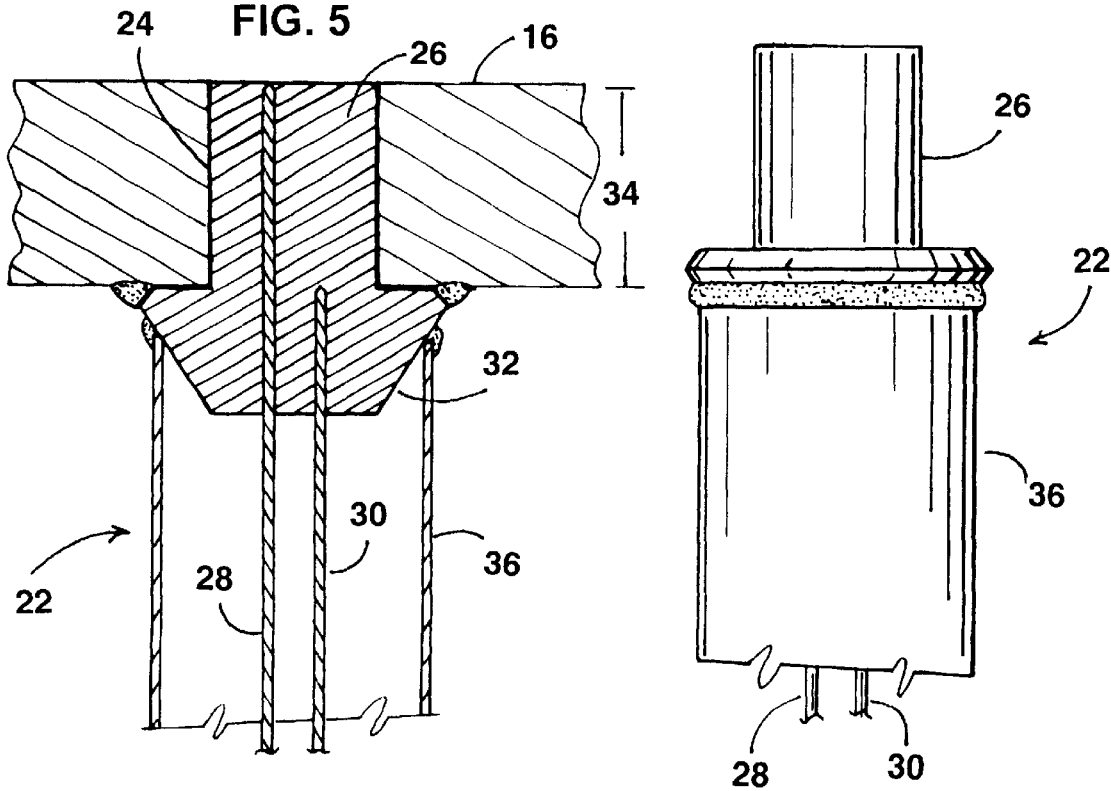

ATTACHABLE HEAT FLUX MEASURING DEVICE

FIELD AND BACKGROUND OF THE INVENTION

The present invention relates in general to measurement of heat flux in different furnace locations and more particularly to an attachable heat flux meter using thermocouples.

DESCRIPTION OF THE PRIOR ART

The measurement of the heat absorbed by a furnace wall can be calculated by knowing the difference between the temperatures of two points that are parallel to the flow of heat through a material that separates the heating source from the cooling source. In large steam generating boilers, the combustion of the fuel inside the furnace creates combustion gases and ash particles that radiate energy to the enclosure walls of the furnace. The enclosure walls consist of pressurized water cooled tubes that are connected with metal bars, referred to as membrane or webs, and which provide a gas tight barrier that keeps the high temperature furnace gases inside the enclosure. The radiant heat from the combustion gases inside the furnace are absorbed by the furnace walls and the rate at which the heat is absorbed by unit area is referred to as heat flux.

Many different known concepts are used to determine the heat flux absorbed in a location of a furnace. Calorimeter, Gardon gage, heat pipes and various thermocouple types of heat flux probes are used and they vary in cost and effectiveness.

One known chordal heat flux measurement device is manufactured by The Babcock and Wilcox Company. This type of measurement device requires drilling at least two openings along the surface of a boiler tube and installing a thermocouple into each of the openings. The ends of the thermocouples are located at the crown of the tube (the closest point along the curvature of the tube that heat can be absorbed on the inside of the furnace wall) at an acceptable distance apart. Using the temperature readings from the thermocouples and knowing the distance that the thermocouples are apart provides data that are used in calculating the heat flux of the energy absorbed by the tube. In most applications, an additional thermocouple is attached to the unheated side of the tube so as to measure the temperature of the fluid flowing through the tube. A brochure that describes a SDF type of chordal thermocouple is entitled "Chordal Thermocouples" and is available from The Babcock & Wilcox Company.

Another heat flux meter called the Fluxdome is marketed by Land Combustion Inc. This device is used for boiler applications to measure the heat flux at a point on a tube, and consists of thermocouples that are placed into a metallic cylinder that is welded on the crown of the furnace tube. The heat flux is determined from the measured temperature difference between the two thermocouples, knowing the distance between the couples and the thermal conductivity of the material in which the thermocouples are embedded.

All such known devices require the placement of thermocouples or other measuring devices on the furnace tubes by drilling into the tube. This is undesirable and dangerous since it weakens the tube wall. A device is thus needed that will not require entering the furnace enclosure or the weakening of the furnace tube walls.

BRIEF SUMMARY OF THE INVENTION

The present invention solves the previously mentioned problems associated with prior art devices by attaching a heat flux device to the boiler tube membrane. The concept of this invention is to measure the heat flux at the membrane location of the furnace wall. The attachable heat flux meter is inserted into an opening that is drilled into the center of the membrane between two tubes of the furnace wall. This opening is drilled through the membrane and is sized slightly larger than the diameter of the metal cylinder of the heat flux device. The device allows the heat absorbed on the surface of the metal cylinder to flow down the cylinder and into the membrane of the furnace wall. The heat flux meter is attached to the outside or casing side of the furnace by welding the bracket of the device to the membrane.

The measurement of the heat flux is determined in a similar fashion as the chordal thermocouple. Two thermocouples are installed in the meter at a set distance apart. The heat flux is calculated through known heat conduction equations. By knowing the temperatures from the two thermocouples, the vertical distance between the two thermocouples, and the conductivity of the material in which the thermocouples are imbedded, the heat flux at the membrane location can be calculated by a known equation.

In view of the foregoing it will be seen that one aspect of the present invention is to provide a heat flux measurement device that does not require penetration of pressure parts such as the furnace wall tubes.

Another aspect of the present invention is to provide a heat flux measurement device that is easily installed from the outside or casing side of the furnace.

These and other aspects of the present invention will be more fully understood from a review of the following description of the preferred embodiment when considered with the accompanying drawings.

BRIEF DESCRIPTION OF THE DRAWINGS

In the drawings;

FIG. 1 is a side view of a typical boiler having pressurized water tube walls.

FIG. 2 is a perspective view of a part of the combustion zone of the FIG. 1 boiler showing typical heat flux meter locations on the boiler tube walls.

FIG. 3 is an expanded view of the pressurized water tube walls of the boiler as shown in FIGS. 1 and 2.

FIG. 4 is an expanded view of a heat flux meter of the present invention mounted to one membrane connecting the pressurized water tubes of FIG. 3.

FIG. 5 is a sectional view of the FIG. 4 heat flux meter showing the locations of the surface and depth thermocouples.

FIG. 6 is an external view of the heat flux meter of FIG. 4.

DETAILED DESCRIPTION OF THE PREFERRED EMBODIMENT

Turning now to the drawings which are intended to depict a preferred embodiment of the invention without limiting the invention thereto. FIGS. 1–3 show a typical boiler (10) having pressurized water tube walls (12) comprising water tubes (14) connected by membrane walls (16). The tubes (14) on the furnace side or inside of the boiler are heated by radiant and combustion gas heat. The outside wall of the furnace has an insulation layer (18) covered by a casing (20).

The most critical region in the boiler (10) is in the furnace wall tubes (14) adjacent to the combustion zone as shown in FIG. 2. The heat input is highest in this region and results in high external metal tube wall temperatures.

Under normal conditions the temperature of the inner surface of a boiler tube is only a few degrees above the saturation temperature of the boiler water whereas the outer surface, exposed to furnace temperature, will be 25° F.–110° F. above saturation temperature depending on the heat transfer rate and thickness of the tube wall.

If feedwater quality deteriorates, some deposition of calcium, magnesium, iron and silicon salts will occur. Deposition on the inner wall acts as an insulator, or barrier to heat transfer. The result is an increase in temperature of both the inner and outer wall of the tube (14). If deposition continues, the outer wall temperature will rise above the use limit for the metal which, for carbon steel, is on the order of 850° F. The tube wall will overheat, and the water pressure will cause it to swell and finally thin to the point where it will fail. Deposition inside the tubes (14) can be detected and monitored by instrumenting key furnace tubes (14) with a heat flux meter (22) of the present invention mounted to the furnace wall (12). The meter (22) can calculate the surface temperature of the tube (14) exposed to the combustion process and compare it with the saturation temperature of the boiler water.

Beginning with a clean, deposit free boiler, after startup or chemical cleaning, the instrumented wall (12) is monitored to establish the temperature differential at two or three boiler ratings. This establishes a base curve. At maximum load, with a clean-condition tube, the surface thermocouple will indicate temperatures of 25° F.–40° F. above saturation in low-duty units and 80° F.–100° F. in high-duty units. The heat flux meter is monitored periodically for any increase in temperature differential above the base curve so as to detect internal scale buildup.

Any accumulation of waterside deposit increases the furnace wall (12) temperature reading. Chemical cleaning should be considered if the differential temperature at maximum boiler load increases 100° F. over the clean-condition base curve.

Initially, readings should be taken weekly, preferably using the same equipment and procedure as that for establishing the base curve. The frequency of checking should be increased under upset conditions, when it is indicated that deposits are forming rapidly.

The concept of the present invention, as best seen in FIGS. 4–6, is to measure the heat flux at the membrane (16) location of the furnace wall (12). The attachable heat flux meter (22) is inserted into an opening (24) that is drilled into the center of the membrane (16) between two tubes (14) of the furnace wall (12). This opening (24) would be sized slightly larger than the diameter of the metal cylinder or sensor portion (26) of the heat flux meter (22). The meter (22) will allow the heat absorbed on the surface of the metal cylinder (26) to flow down the cylinder and into the membrane (16) of the furnace wall (12). The heat flux meter (22) is attached to the casing side of the furnace wall by welding a bracket (32) holding the meter (22) to the membrane (16).

The measurement of the heat flux is determined in a similar fashion as the chordal thermocouple. Two thermocouples (28, 30) are installed in the meter (22) at a set distance apart. The heat flux is calculated through the known heat conduction equations. By knowing the temperatures from the two thermocouples, the vertical distance between the two thermocouples, and the conductivity of the material, the heat flux at the membrane location can be calculated by equation 1 as follows:

$$Q/A = K(T_{SURFACE} - T_{DEPTH})/EQUIV_L$$

where:

$Q/A$ = Heat Flow or Heat Flux, BTU/Hr-ft$^2$ $K$ = Thermal Conductivity of the Meter Material, BTU-in/ft$^2$-hr-F.

$T_{SURFACE}$ = Surface Thermocouple Temperature, F.

$T_{DEPTH}$ = Depth Thermocouple Temperature, F.

$EQUIV_L$ = Equivalent Thickness between Surface and Depth Thermocouples, Inch

Since the heat flux determined in Equation 1 is for the membrane (16) location of the wall (12), a correction to the calculated heat flux is required. The correction to the equation is based upon knowing the type of tube membrane wall construction used for the furnace enclosure. The tube membrane wall construction can vary depending upon the type of boiler design, i.e. subcritical, supercritical, once-through, drum and the type of fuel being fired. The typical tube membrane wall construction can vary from 0.75 inch outside diameter tubes to 3.0 inch outside diameter tubes and centerline spacing between tubes from 1.25 inches to 4.0 inches or greater. For the different types of tube membrane walls a variable "C" for each enclosure type is determined which corrects the membrane heat flux calculated in equation 1 to the heat flux at the crown of the tube.

The correction factor or variable "C" in equation 2 for a desired tube membrane enclosure can be determined by one skilled in the field of heat transfer from computational heat transfer programs or through the publications given below.

Commercially available finite element computer programs such as COSMOS by Structural Research and Analysis Corporation or PATRAN by MacNeal Schwender Corporation can be used to determine the value of the variable "C".

The following publications can also be used for the determination of the value of the variable "C":

(1) Heat Transfer in Membrane Waterwalls by B. D. Bowen, M. Fournier and J. R. Grace, International Journal of Heat and Mass Transfer, Vol. 34, No. 4/5, pp. 1043–1057, 1991 and (2) Temperatures and Stresses in a Boiler Membrane Wall Tube by F. Di Pasquantonio and A. Macchi, Nuclear Engineering and Design, Vol. 31, No. 2, pp. 280–293, January, 1975.

The heat flux at the crown of the tube can be calculated by equation 2 as follows:

$$Q/A_{CROWN} = C(Q/A_{MEMBRANE})$$

where:

$Q/A_{CROWN}$ = Heat Flow or Heat Flux at the crown of the tube, BTU/Hr-ft$^2$ $Q/A_{MEMBRANE}$ = Heat Flow or Heat Flux at the membrane between tubes, BTU/hr-ft$^2$ $C$ = Correction factor for crown heat flux from membrane heat flux for different tube membrane construction.

The heat flux at the crown is the largest in magnitude due to the field of view that this point has of the furnace volume. The field of view is the largest at the crown than any point on either the tube or membrane. Since the heat absorbed by the tube is overwhelmingly through radiant heat transfer, the larger field of view will result in the largest heat absorption.

The physical characteristics of the meter as shown in FIGS. 4–6 are as follows. The sensor portion (26) of the device is approximately 0.25 inches in diameter and has a length that can vary depending upon the thickness of the membrane used in the furnace enclosure. The bracket or attachment portion (32) of the meter (22) can be circular or oblong. Typically, the smallest diameter or width of the attachment portion is 0.375 inch. In the oblong design of the attachment portion, the length can be 1 inch or more.

The meter (22) is welded in place on the casing side of the furnace enclosure. A 0.3125 inch opening is drilled into the membrane (16). The meter (22) is centered in the opening by placing a specially machined piece of ceramic insulation material around the meter (22) that allows for concentric placement of the meter in the opening (24) hole. After placement of the meter, the meter (22) can be attached to the casing side of the furnace enclosure by welding it to the membrane (16) and in the case of a narrow membrane also to each tube on both sides of the membrane.

After the body of the meter (22) has been installed, the thermocouples (28, 30) are inserted into drilled openings (24) in the back side of the attachment portion (32) of the meter (22) and peened into place. The distance between thermocouples will be at least 0.250 inch but can be larger depending upon the thickness (34) of the membrane (16). The thermocouples (28, 30) are routed through a protection (36) tube that is tack welded to the back side of the attachment portion (32) of the meter (22). The protection tube (36) can vary in length depending upon the installation location in the furnace enclosure. A much longer protection tube (36) is needed if the meter (22) is installed in the windbox location of the furnace enclosure.

The temperatures from the thermocouples are determined by measuring the amperes or voltage from each thermocouple in a known manner.

The meter (22) described herein has two particular advantages over the existing devices known to date. One is that this device is much easier to install, and the second is that no pressure part modifications are required.

The device is easier to install because no scaffolding is required inside the furnace. The device can be completely installed on the outside or casing side of the furnace using the existing platforms thereon (not shown). Also, unlike the chordal thermocouples and the Fluxdomes, no pressure part modifications are required with the present invention.

Certain modifications and additions will occur to those skilled in this art area after reading the foregoing. It will be understood that all such modifications and additions have been deleted herein for the sake of conciseness and readability but are intended to fall within the scope of the following claims.

We claim:

1. A heat flux meter for measuring the heat flux at a location on the wall of a boiler comprising:
    a boiler wall having a plurality of pressurized water tubes connected by a plurality of membranes;
    at least one of said membranes having an opening extending therethrough; and
    a heat flux meter mounted in said opening from the outside of said boiler wall wherein said heat flux meter comprises a sensor portion fitting into the opening in said membrane and an attachment portion mounted to said membrane and includes a pair of spaced thermocouples extending from said attachment portion into said sensor portion to be spacedly located therein and in said membrane.

2. A heat flux meter as set forth in claim 1 wherein said attachment portion of said meter is welded to said membrane.

3. A heat flux meter as set forth in claim 2 wherein the attachment portion is welded to each water tube on opposite sides of said membrane.

4. A heat flux meter as set forth in claim 1 where in the heat flux is calculated from thermocouple measurements of temperature according to the chordal thermocouple equation compensated for membrane effect according to the equation:

$$Q/A_{CROWN} = C(Q/A_{MEMBRANE})$$

where:

$Q/A_{CROWN}$ = Heat Flow or Heat Flux at the crown of the tube, BTU/Hr-ft$^2$ $Q/A_{MEMBRANE}$ = Heat Flow or Heat Flux at the membrane between tubes, BTU/Hr-ft$^2$ $C$ = Correction factor for crown heat flux from membrane heat flux for different tube membrane construction.

5. A method of calculating the heat flux at the crown of a boiler tube, the boiler tube connected to an adjacent tube with a membrane, the boiler tube, adjacent tube and membrane each having a furnace side and a casing side, comprising the steps of:
    providing a heat flux meter body having an attachment portion and a sensor portion connected to the attachment portion, the attachment portion having a back side with attachment portion openings therethrough, and the sensor portion having a sensor diameter;
    providing a membrane opening through the membrane, the membrane opening having a membrane opening diameter;
    inserting the sensor portion into the membrane opening from the casing side of the membrane;
    attaching the attachment portion to the casing side of one of the membrane, the boiler tube and the adjacent tube;
    inserting a first thermocouple into an attachment portion opening, inserting a second thermocouple into an attachment portion opening, and securing the thermocouples into place spaced a set distance apart in the sensor portion within the membrane;
    calculating a membrane heat flux at the membrane opening from temperatures obtained from the first and second thermocouples; and calculating the heat flux at the crown of the boiler tube by applying a correction to the membrane heat flux.

6. The method of claim 5, wherein the first thermocouple is placed within the membrane adjacent the furnace side of the membrane, and the second thermocouple is placed within the membrane adjacent the casing side of the membrane.

7. The method of claim 5, wherein the distance between first and second thermocouples is at least 0.25 inches.

8. The method of claim 5, wherein the membrane opening diameter is slightly larger than the sensor diameter.

9. The method of claim 5, further comprising providing a machined piece of ceramic insulation around the heat flux meter body for concentric placement in the membrane opening.

10. The method of claim 5, wherein the thermocouples are secured into place by peening.

11. The method of claim 5, wherein the thermocouples are routed through a protection tube.

12. The method of claim 11, wherein the protection tube is tack welded to the attachment portion.

13. The method of claim 5, wherein the attachment portion is a bracket.

14. The method of claim 5, wherein the sensor portion is a metal cylinder.

15. A heat flux meter for determining the heat flux at the crown of a boiler tube, the boiler tube connected to an adjacent tube with a membrane, the boiler tube, adjacent tube and membrane each having a furnace side and a casing side, comprising:

a heat flux meter body having a metal cylinder connected to a bracket, the bracket for attaching the heat flux meter body to the casing side of one of the membrane, the boiler tube and the adjacent tube, the bracket having bracket openings therethrough;

a first thermocouple inserted through a bracket opening and a second thermocouple inserted through a bracket opening, the thermocouples secured into place spaced a set distance apart in the metal cylinder; and wherein the metal cylinder is designed th locate thermocouples within the membrane in operation.

16. The heat flux meter of claim 15, further comprising a machined piece of ceramic insulation placed around the heat flux meter body to provide for concentric placement within a membrane opening.

17. The heat flux meter of claim 15, wherein the thermocouples are routed through a protection tube attached to the bracket.

18. The heat flux meter of claim 15, wherein the thermocouples are secured into place by peening.

19. The heat flux meter of claim 15, wherein the thermocouples are spaced at least 0.25 inches apart.

* * * * *